US012589585B2

(12) United States Patent　　　　　　(10) Patent No.:　US 12,589,585 B2

Roesle et al.　　　　　　　　　　　　　(45) Date of Patent:　Mar. 31, 2026

(54) PREPREG COMPOSITE MATERIAL PLY AND BACKING SEPARATION SYSTEMS AND METHODS

(71) Applicant: Accudyne Systems, Inc., Newark, DE (US)

(72) Inventors: Matthew Roesle, Newark, DE (US); Ira Lockwood, Newark, DE (US); Nanette Gopez, Newark, DE (US); John Feyrer, Upper Chichester, PA (US)

(73) Assignee: Accudyne Systems, Inc., Newark, DE (US)

( * ) Notice: Subject to any disclaimer, the term of this patent is extended or adjusted under 35 U.S.C. 154(b) by 163 days.

(21) Appl. No.: 18/231,326

(22) Filed: Aug. 8, 2023

(65) Prior Publication Data

US 2025/0050630 A1　　Feb. 13, 2025

(51) Int. Cl.
B32B 43/00　　　　　(2006.01)

(52) U.S. Cl.
CPC ...... B32B 43/006 (2013.01); *B32B 2260/021* (2013.01); *B32B 2260/046* (2013.01); *B32B 2305/076* (2013.01); *Y10T 156/1179* (2015.01); *Y10T 156/1989* (2015.01)

(58) Field of Classification Search
CPC ............ B32B 43/006; Y10T 156/1179; Y10T 156/1989
See application file for complete search history.

(56) References Cited

U.S. PATENT DOCUMENTS

| 5,861,077 | A | 1/1999 | Kamijo et al. | |
| 9,358,770 | B2 | 6/2016 | Dong et al. | |
| 9,517,615 | B2 | 12/2016 | Dong et al. | |
| 10,207,487 | B1 | 2/2019 | Hockemeyer et al. | |
| 10,518,521 | B2 * | 12/2019 | Tao ...................... | H10K 71/221 |
| 11,155,070 | B2 | 10/2021 | Pierce et al. | |
| 2015/0059987 | A1 * | 3/2015 | Kumakura ............ | H10K 71/40 |
| | | | | 156/761 |

(Continued)

FOREIGN PATENT DOCUMENTS

| GB | 2490152 A | 10/2012 |
| JP | 6745745 B2 | 8/2020 |

OTHER PUBLICATIONS

Bjornsson et al., "Automated Removal of Prepreg Backing Paper—A Sticky Problem," SAE Technical Paper 2013-01-2289, Sep. 17, 2013, pp. 10.

*Primary Examiner* — Philip C Tucker
*Assistant Examiner* — Nickolas R Harm
(74) *Attorney, Agent, or Firm* — Faegre Drinker Biddle & Reath LLP

(57)　　　　　　ABSTRACT

A system for separating a prepreg composite material ply from a backing includes a first support configured to contact a first surface of the backing apart from a corner defined by the ply and the backing. A second support is configured to contact a second surface of the ply apart from the corner. A corner displacer is coupled to at least one of the first support and the second support. The corner displacer is configured to displace the corner in a first direction and an opposite second direction to thereby bend portions of the ply and the backing between the corner and the first support and the second support, and the portions of the ply and the backing thereby separate from each other.

18 Claims, 15 Drawing Sheets

(56)          References Cited

U.S. PATENT DOCUMENTS

| | | | |
|---|---|---|---|
| 2015/0314584 A1* | 11/2015 | Dong | B32B 43/006<br>156/701 |
| 2016/0176181 A1* | 6/2016 | Kim | B32B 38/10<br>156/701 |
| 2016/0311212 A1* | 10/2016 | Dong | B26D 3/28 |
| 2018/0117721 A1* | 5/2018 | Cai | B23P 19/04 |

* cited by examiner

300

PROVIDE SHEET
COMPRISING PLY AND
BACKING — 302

POSITION SHEET WITH
CORNER DISPOSED APART
FROM FIRST SUPPORT AND
SECOND SUPPORT — 304

ACTUATE CORNER
DISPLACER(S) TO DISPLACE
CORNER, BEND SHEET, AND
INITIATE SEPARATION OF
PLY AND BACKING — 306

CONTINUE AND COMPLETE
SEPARATION OF PLY AND
BACKING — 308

1

PREPREG COMPOSITE MATERIAL PLY AND BACKING SEPARATION SYSTEMS AND METHODS

CROSS REFERENCE TO RELATED APPLICATION

None.

FIELD OF THE DISCLOSURE

The present disclosure generally relates to systems and methods for separating thermoset prepreg fiber-reinforced plastic plies from backings. More specifically, the present disclosure relates to systems and methods for initiating separation of corners of plies from backings.

BACKGROUND

High-performance aerospace components are typically constructed of thermoset prepreg fiber-reinforced plastic materials, which are also referred to simply as composite materials. Such materials are a mixture of high-strength fibers that are fixedly held in a plastic matrix. The fibers provide most of the strength of the material, and the plastic matrix holds the fibers together and distributes loads between the fibers. The fibers are typically constructed of carbon (more specifically, graphite) or glass. In some cases, composite materials include a combination of fiber materials.

Prepreg is raw material including a plastic matrix pre-mixed with high-strength fibers, typically provided in long and continuous rolls of thin fabric. Prepreg is typically used by component manufacturers to ensure that the matrix is well-mixed with the fibers and that the matrix-to-fiber ratio is correct.

Thermoset composite materials typically use a thermoset plastic resin, such as an epoxy, as the matrix. Thermoset plastics are initially sticky, viscous liquids that solidify by undergoing a chemical reaction, referred to as curing, after which they remain solid. In contrast, thermoplastics melt when heated and can be remelted many times.

Thermoset prepreg material has tack or stickiness until it is cured, so such a material is placed on a backing, such as a plastic-coated paper, during manufacturing. Without a backing, the material does not sufficiently hold its shape, and pieces of the material can stick to each other and themselves. In some cases, a second sheet of material is also placed on the top side of prepreg. The second sheet, referred to as a cover film or polyfilm, is typically a thin plastic sheet.

Components constructed of prepreg composites are typically manufactured by stacking layers of the raw material, referred to as plies. Such a process is referred to as layup, and the unfinished component may be referred to as a layup during the process. The plies are pre-cut to the shape of the component and stacked, one at a time, on a mold that defines the contours of the component. Components manufactured via such a process may include several plies to several hundred plies, depending on the nature and function of the components. After layup is complete, the components are placed in a pressurized oven that cures the thermoset plastic.

During layup, the plies are typically cut to the appropriate shape while the composite material is still on its backing, and then the backing is removed from each ply immediately before it is placed on the layup. Initiating separation, or peeling, of the ply and backing is difficult because the resin in the ply sticks aggressively to the backing. Additionally, because the ply and backing are cut to shape together, there is no excess backing protruding past the edge of the ply that could be used to facilitate separation.

Operators that manually lay up composite components develop personal techniques for separating plies from their backings. Such techniques typically include ruffling, flicking, or striking a corner of the ply; scraping a corner of the ply with a blade; and/or inserting a sharp blade between the ply and backing at a corner. After a corner of the ply has been separated from its backing, peeling the remainder of the ply from the backing is relatively easy—the separated portions of the ply and the backing are grasped in separate hands and pulled apart.

Automated layup systems and methods also experience difficulties when separating backings from plies, and the techniques used by human operators are not feasible for automated equipment that lacks the dexterity, visual processing, and adaptability of human operators. Accordingly, improved systems and methods for initiating separation of backings from plies would be beneficial.

SUMMARY

In an Example 1, a system for separating a ply from a backing is provided. The backing includes a first surface facing away from the ply, the ply includes a second surface facing away from the backing, and the ply and the backing together define a corner. The system includes a first support configured to contact the first surface apart from the corner; a second support configured to contact the second surface apart from the corner; and a corner displacer coupled to at least one of the first support and the second support. The corner displacer is configured to displace the corner in a first direction and an opposite second direction to thereby bend portions of the ply and the backing between the corner and the first support and the second support, and the portions of the ply and the backing thereby separate from each other.

In an Example 2, the system of Example 1, wherein the corner displacer is configured to bend the portions of the ply and the backing about a bending axis, and the bending axis is substantially parallel to the first surface and the second surface.

In an Example 3, the system of Example 1, wherein the corner displacer is a first corner displacer, and further including a second corner displacer coupled to the at least one of the first support and the second support.

In an Example 4, the system of Example 3, wherein the first corner displacer is pivotable relative to the at least one of the first support and the second support about a first axis, the second corner displacer is pivotable relative to the at least one of the first support and the second support about a second axis, and the second axis is different than the first axis.

In an Example 5, the system of Example 4, wherein the first axis and the second axis are substantially perpendicular.

In an Example 6, the system of Example 3, wherein the ply and the backing include a first edge and a second edge, the first edge and the second edge intersect at the corner, and the first corner displacer is configured to contact the first edge and the second corner displacer is configured to contact the second edge.

In an Example 7, the system of Example 1, wherein the second support includes an end effector configured to displace the ply and the backing relative to the first support.

In an Example 8, the system of Example 1, further including a gripper coupled to the first support, and the gripper is configured to grip the separated portion of the backing.

In an Example 9, a method for separating a ply from a backing by using a separating system is provided. The backing includes a first surface facing away from the ply, the ply includes a second surface facing away from the backing, and the backing and the ply together define a corner. The separating system includes a first support, a second support, and a corner displacer. The method includes (A) contacting the first support against the first surface and the second support against the second surface such that the corner is disposed apart from the first support and the second support; (B) actuating the corner displacer to displace the corner in a first direction and an opposite second direction to thereby bend portions of the ply and the backing between the corner and the first support and the second support, the portions of the ply and the backing thereby separating from each other; and (C) relatively displacing the separated portions of the ply and the backing away from each other, and other portions of the ply and the backing thereby separating from each other.

In an Example 10, the method of Example 9, wherein the corner displacer bends the portions of the ply and the backing about a bending axis, and the bending axis is substantially parallel to the first surface and the second surface.

In an Example 11, the method of Example 10, wherein the ply includes fibers and a resin, the fibers are elongated in a fiber direction, and the bending axis are substantially perpendicular to the fiber direction.

In an Example 12, the method of Example 9, wherein an adhesive bond is disposed between the ply and the backing, and bending the portions of the ply and the backing between the corner and the first support and the second support causes the adhesive bond to break, and the portions of the ply and the backing thereby separate from each other.

In an Example 13, the method of Example 9, wherein actuating the corner displacer to bend the portions of the ply and the backing includes actuating the corner displacer for a plurality of cycles.

In an Example 14, the method of Example 13, wherein each cycle has a maximum duration of two seconds.

In an Example 15, the method of Example 9, wherein the corner displacer is a first corner displacer, and further including a second corner displacer, and actuating the corner displacer to displace the corner includes pivoting the first corner displacer and the second corner displacer relative to at least one of the first support and the second support.

In an Example 16, the method of Example 15, wherein pivoting the first corner displacer and the second corner displacer relative to the at least one of the first support and the second support includes pivoting the first corner displacer about a first axis and pivoting the second corner displacer about a second axis, and the second axis is different than the first axis.

In an Example 17, the method of Example 16, wherein the first axis and the second axis are substantially perpendicular.

In an Example 18, the method of Example 15, wherein the ply and the backing include a first edge and a second edge, the first edge and the second edge intersecting at the corner, and pivoting the first corner displacer and the second corner displacer relative to the at least one of the first support and the second support includes contacting the first corner displacer with the first edge and contacting the second corner displacer with the second edge.

In an Example 19, the method of Example 9, wherein the second support includes an end effector, further including displacing the ply and the backing relative to the first support by using the end effector, and wherein contacting the first support against the first surface and the second support against the second surface includes holding the ply and the backing against the first support by using the end effector.

In an Example 20, the method of Example 9, wherein the separating system further includes a gripper coupled to the first support, and relatively displacing the separated portions of the ply and the backing away from each other includes gripping the backing with the gripper.

BRIEF DESCRIPTION OF THE DRAWINGS

For illustrative purposes, the drawings show embodiments which are presently preferred. However, it should be understood that the present disclosure is not limited to the embodiments illustrated in the drawings.

DETAILED DESCRIPTION OF THE DRAWINGS

Figure 1:
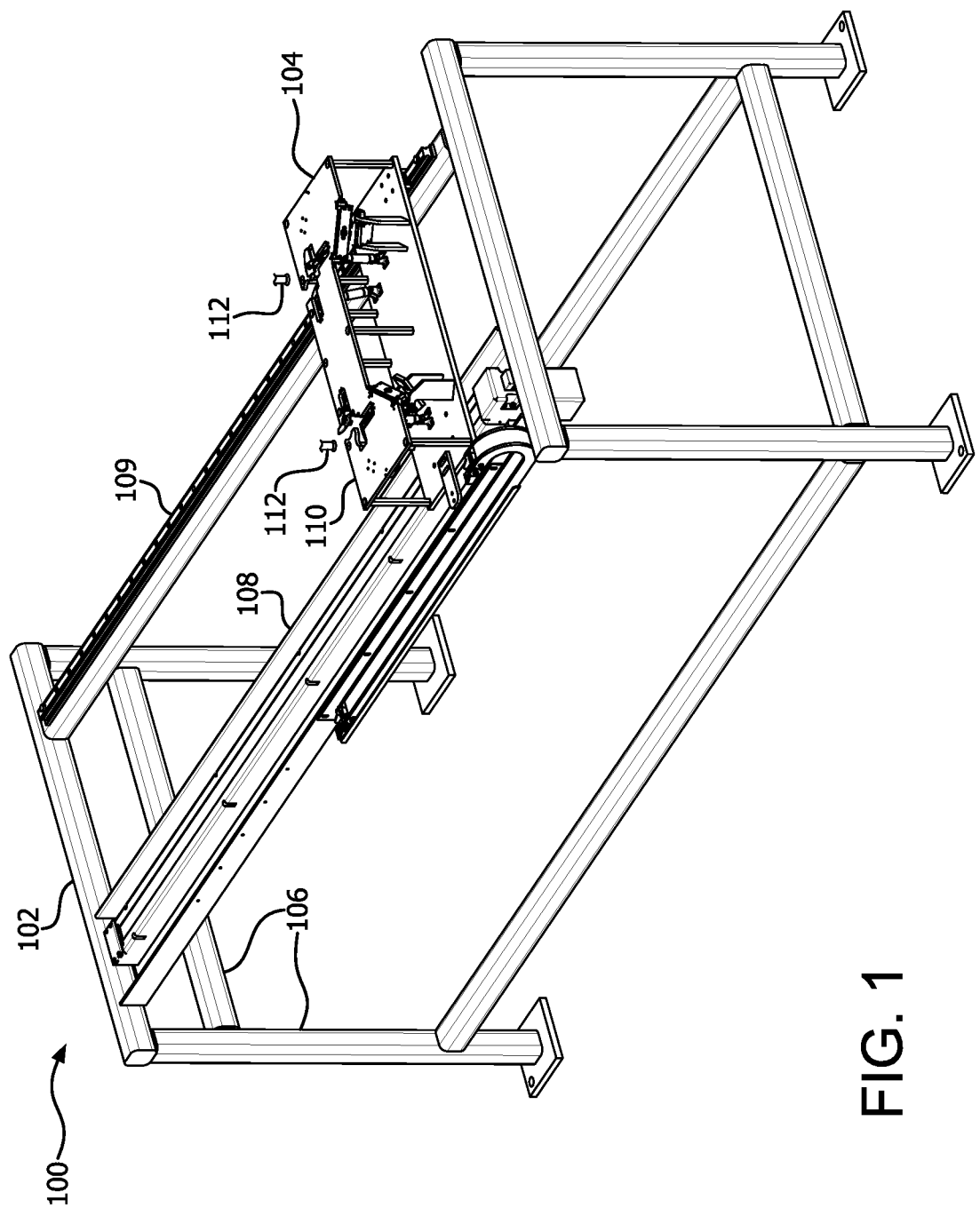
FIG. 1 is a perspective view of a system for separating thermoset prepreg fiber-reinforced plastic plies from their backings, according to an embodiment of the present disclosure.

Referring to the drawings, wherein like reference numerals identify corresponding or similar elements throughout the several views, FIG. 1 illustrates a system 100 for separating thermoset prepreg fiber-reinforced plastic plies from their backings, according to an embodiment of the present disclosure. The system 100 generally includes a frame 102 that carries a separator 104. The frame 102 generally includes a plurality of elongated beams and columns 106 that may be constructed of various appropriate materials, such as metals, more specifically aluminum, steel, or iron. The frame 102 may be fixedly coupled to a ground surface (for example, via fasteners—not shown). In other embodiments, the frame 102 may be movable relative to the ground surface (for example, by including a plurality of casters—not shown). In some embodiments and as illustrated, the frame 102 movably supports the separator 104 via a linear actuator 108, more specifically a belt-driven linear actuator, and a linear slide 109. In other embodiments, the separator 104 may be fixedly supported by the frame 102. As described in further detail below, the separator 104 includes a first support 110 for contacting and supporting sheets including plies and backings. As also described in further detail below, the separator 104 also includes one or more end effectors 112 that are coupled to and displaced by robotic arms (not shown). The end effectors 112 (1) displace the sheets including plies and backings relative to the remainder of the separator 104, and (2) act as second supports for contacting and holding the sheets against the first support 110.

Figure 2:
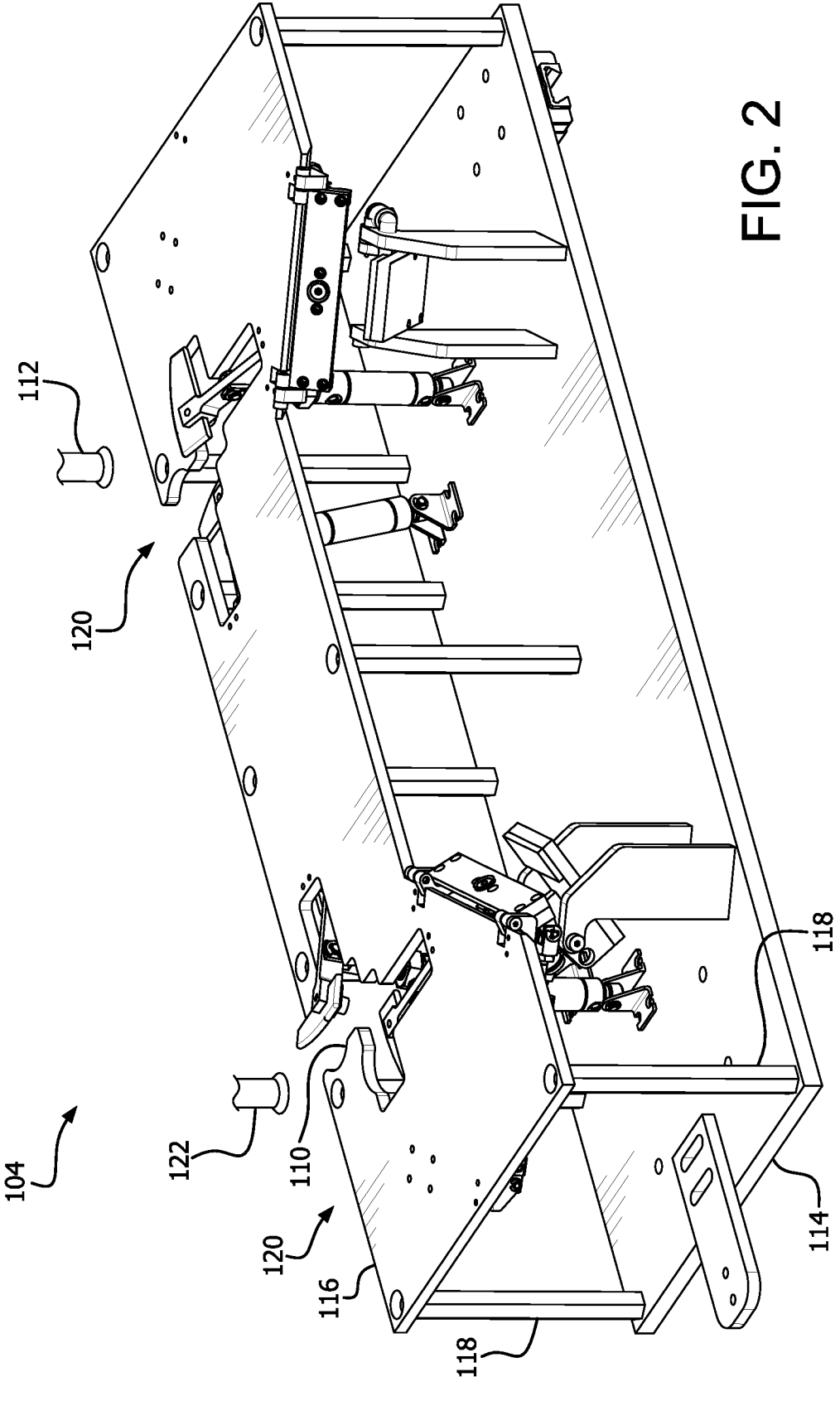
FIG. 2 is a perspective view of a separator of the system of FIG. 1.

FIG. 2 illustrates the separator 104 in further detail. The separator 104 generally includes a lower plate 114, an upper plate 116 that defines the first support 110, and a plurality of intermediate columns 118 coupling the lower plate 114 and the upper plate 116. The components may be constructed of various appropriate materials, such as metals, more specifically aluminum, steel, or iron. As described in further detail below, the lower plate 114 and the upper plate 116 couple to a plurality of driven components that interact with sheets including plies and backings. In some embodiments and as illustrated, the upper plate 116 and the driven components form two separation stations 120 for separately interacting with different sheets including plies and backings. In some embodiments and as illustrated, the separation stations 120 have different orientations, or face different directions, to facilitate placement of plies by the robotic arms and end effectors 112. In other embodiments, the separator 104 includes a single separation station (for example, the system 100 includes a single, relatively large robotic arm and a single end effector 112, and/or if the system 100 is used to separate relatively small plies from relatively small backings). In such embodiments, the single separation station may be rotatable relative to the frame 102. In some embodiments, the separator 104 includes three or more separation stations.

Figure 3:
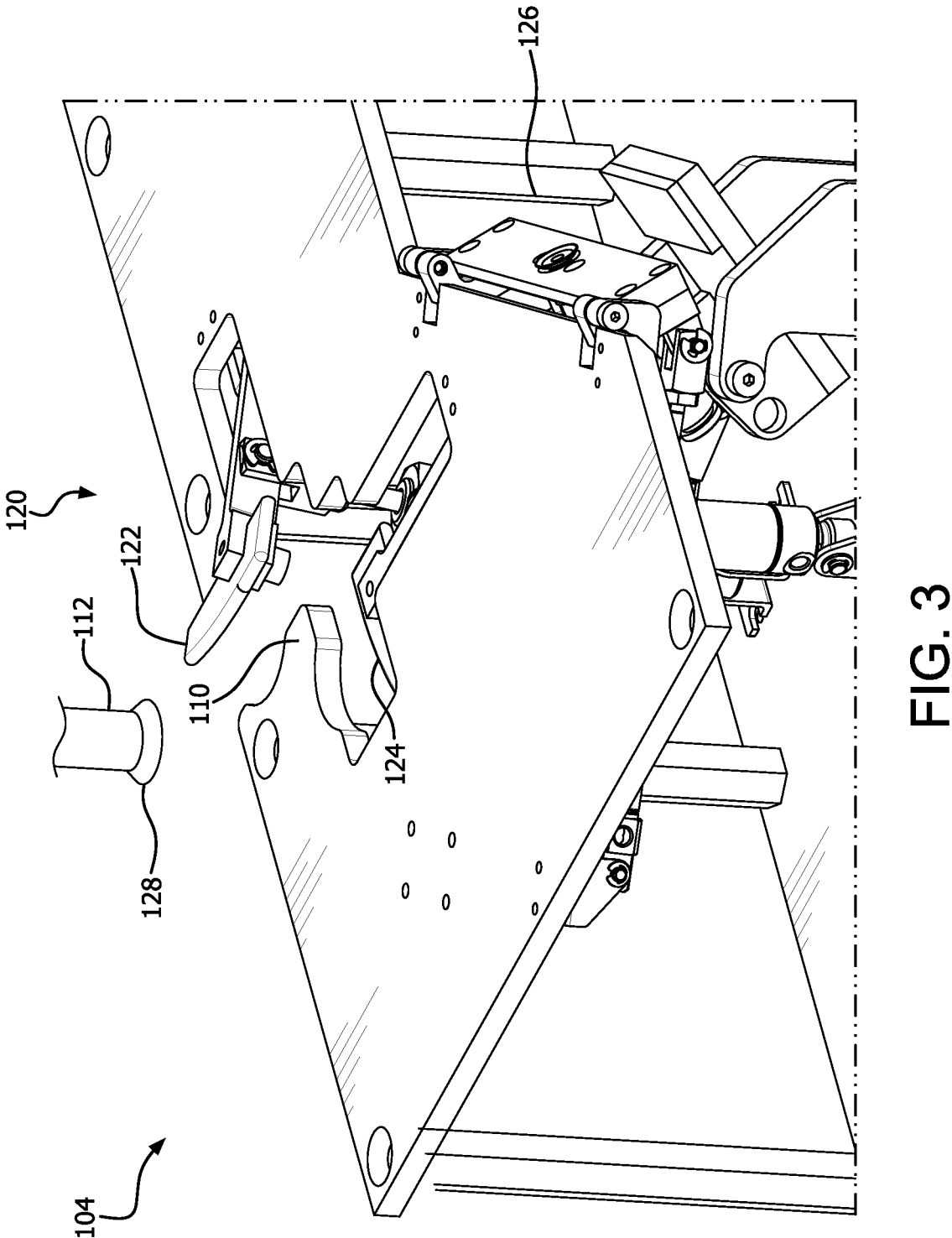
FIG. 3 is a detail perspective view of a separation station of the separator of FIG. 2.

FIG. 3 illustrates the separator 104 in further detail. FIG. 3 only illustrates one separation station 120 of the separator 104, although it is understood that the other separation station 120, respectively, have similar features. The illustrated separation station 120 includes a first corner displacer 122 and a second corner displacer 124. In other embodiments, the separation station 120 includes a single corner displacer or one or more additional corner displacers. As described in further detail below, the corner displacers 122, 124 are actuated to repeatedly displace the corner of a sheet secured between the first support 110 and the end effector 112, acting a second support. This action repeatedly bends portions of the sheet between the corner and the first support 110 and the end effector 112, and those portions of the ply and backing thereby separate from each other. The separation station 120 further includes a gripper 126. In other embodiments, the separation station 120 includes one or more additional grippers. As described in further detail below, the gripper 126 receives a sheet after being bent by the corner displacers 122, 124. The gripper 126 grips the separated portion of the backing, which facilitates separating the remaining portions of the ply and the backing.

With continued reference to FIG. 3, the end effector 112 generally includes an operative end 128 that is configured to couple to a ply of a sheet. In some embodiments and as illustrated, the operative end 128 includes a suction applicator for coupling to the ply of the sheet. In some embodiments, the suction applicator may employ active suction (for example, by coupling to one or more pneumatic components) to couple to the ply of the sheet. In other embodiments, the end effector 112 may be a different type of mechanical device, such as a needle gripper.

Figure 4:
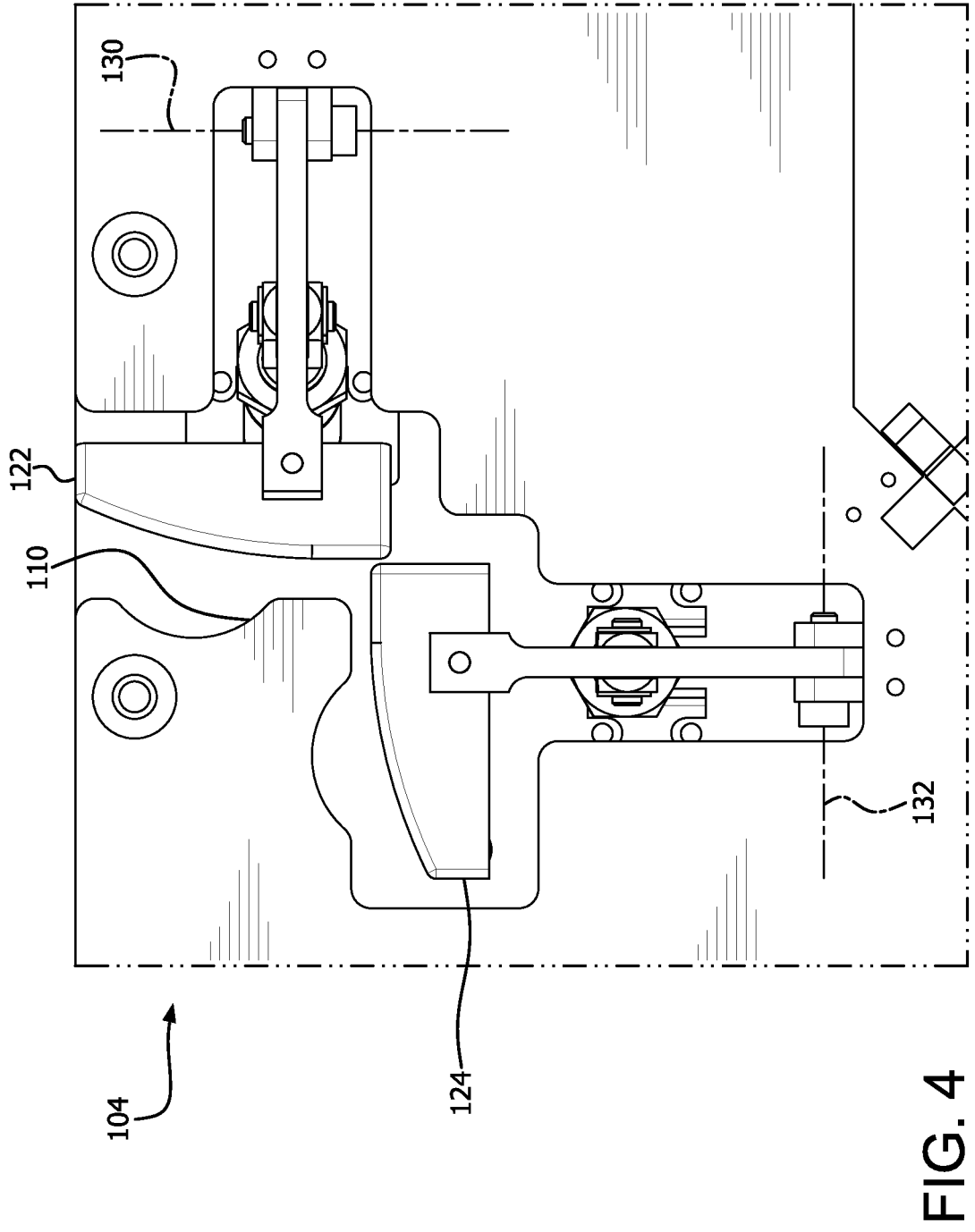
FIG. 4 is a detail top view of a first support and corner displacers of the separation station of FIG. 3.

FIG. 4 illustrates the first support 110 and the corner displacers 122, 124 of the separator 104 in further detail. Upon actuation, the first corner displacer 122 pivots about a first axis 130 relative to the first support 110 and the second corner displacer 124 pivots about a different second axis 132 relative to the first support 110. In some embodiments and as illustrated, the first axis 130 and the second axis 132 are substantially perpendicular to each other (that is, perpendicular±5 degrees). In other embodiments, the axes 130, 132 are not substantially perpendicular to each other. In some embodiments, the first axis 130 and the second axis 132 are substantially parallel (that is, parallel±5 degrees) to the plane of the first support 110. In other embodiments, the axes 130, 132 are not substantially parallel to the plane of the first support 110.

Figure 5:
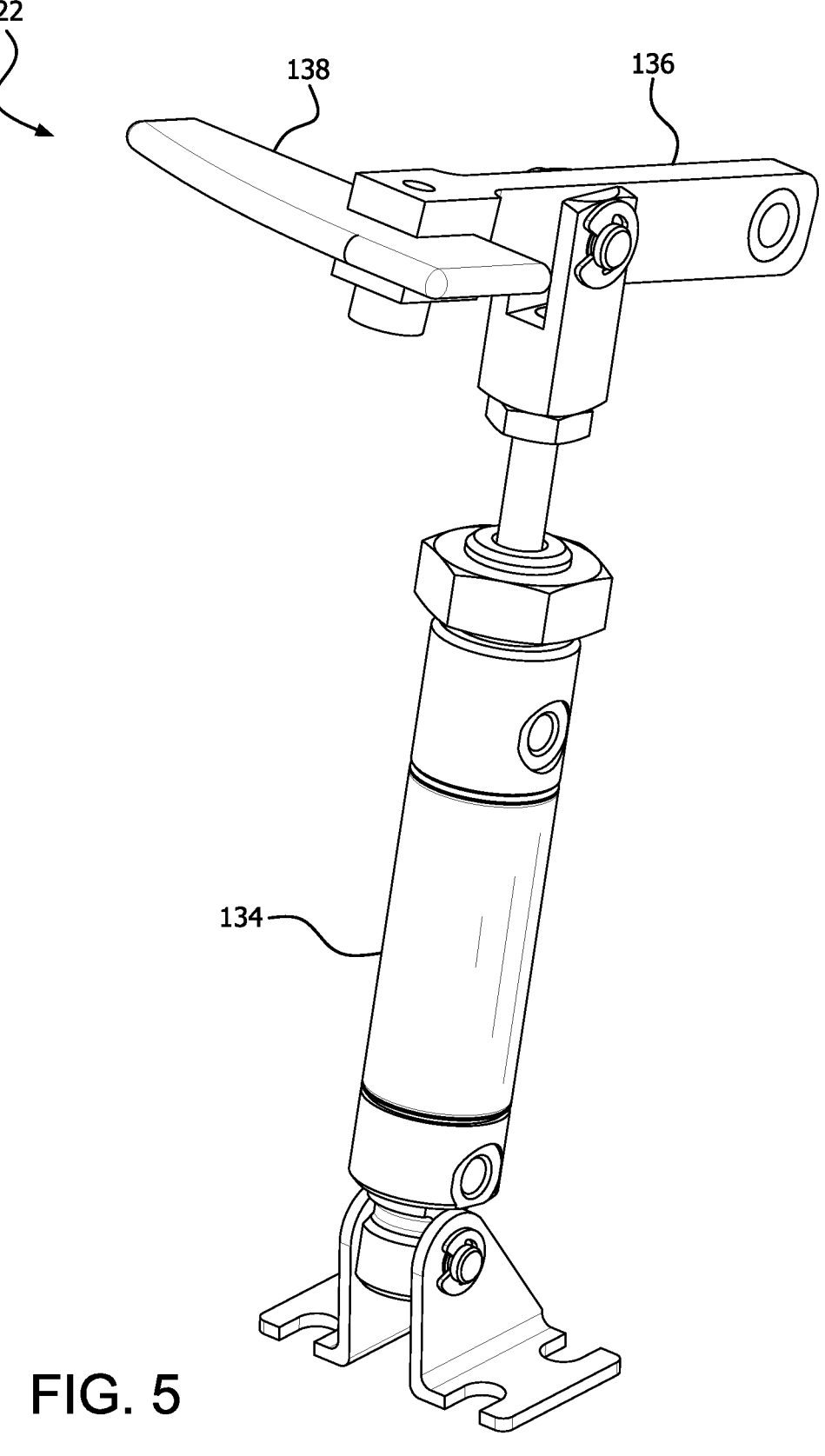
FIG. 5 is a perspective view of one of the corner displacers of FIG. 4.
Figure 6:
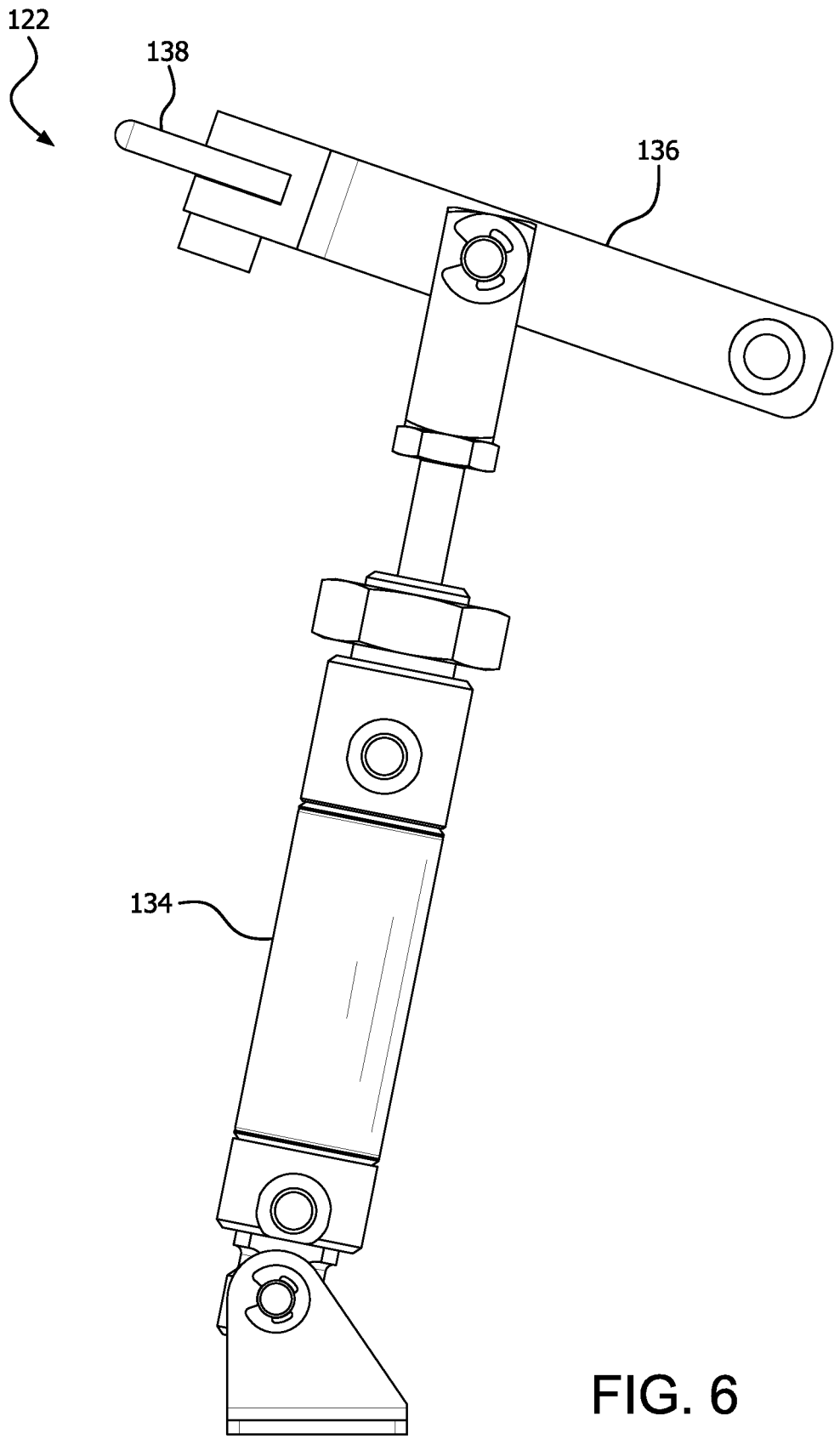
FIG. 6 is a side view of the corner displacer of FIG. 5.

FIGS. 5 and 6 illustrate the first corner displacer 122 in further detail. The second corner displacer 124 is not illustrated in further detail, although it is understood that the second corner displacer 124 has similar features as the first corner displacer 122. The first corner displacer 122 includes a prime mover 134, more specifically a linear actuator, and even more specifically a pneumatic or hydraulic actuator. In other embodiments the prime mover 134 may take different forms. For example, the prime mover 134 may be a different linear actuator, such as a rack and pinion drive, or a rotary actuator, such as an electric motor. The prime mover 134 is coupled to and displaces, more specifically pivots, an arm 136 of the corner displacer 122 relative to the upper plate 116 (shown elsewhere). Upon being displaced relative to the upper plate 116, the arm 136 displaces a corner of a sheet secured between the first support 110 and the end effector 112, acting as the second support (shown elsewhere). The arm 136 includes an operative end 138 that is configured to contact the sheet. In some embodiments and as illustrated, the operative end 138 includes a wing-like shape as viewed from above.

Figure 7:
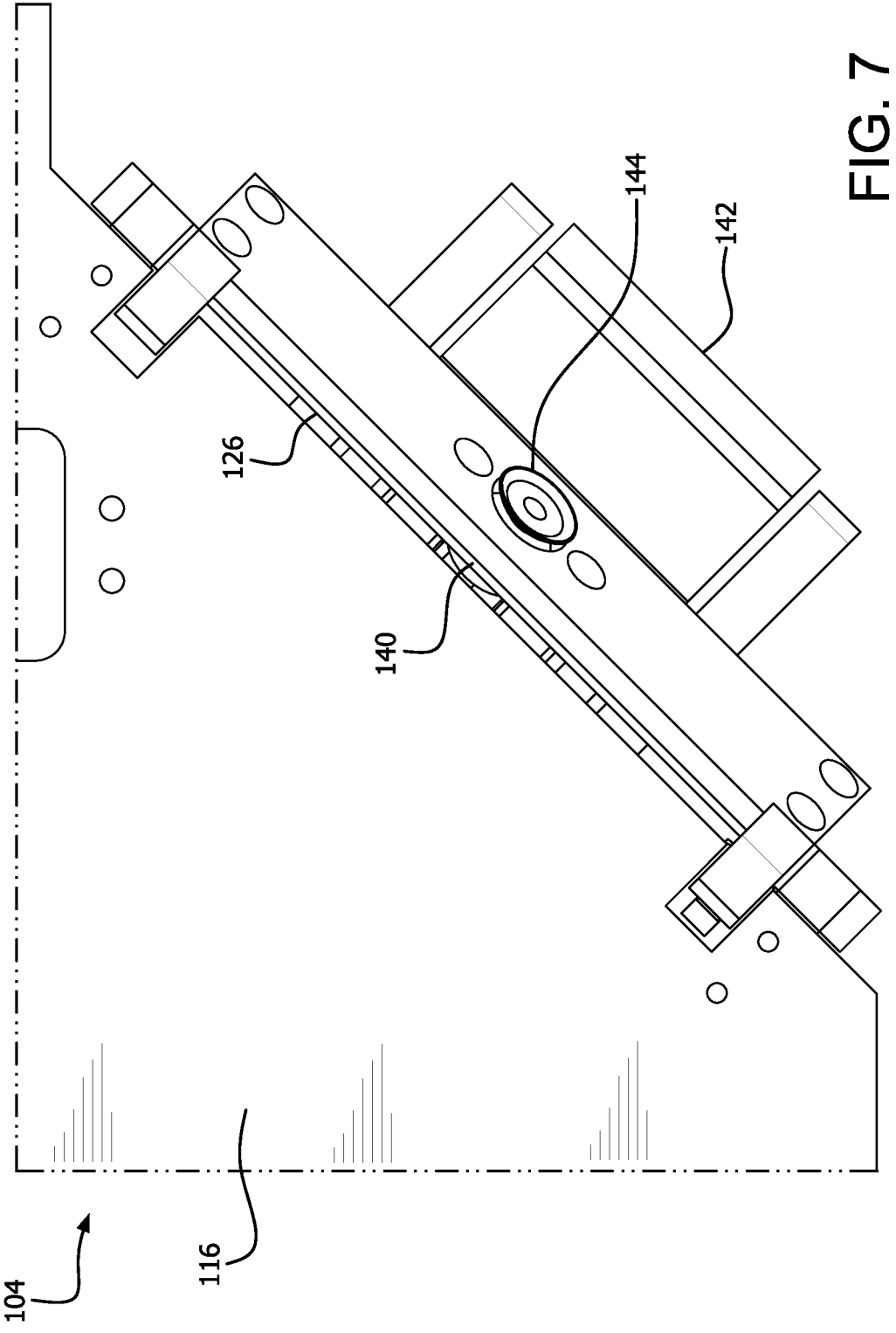
FIG. 7 is a top view of the first support and a gripper of the separation station of FIG. 3.
Figure 8:
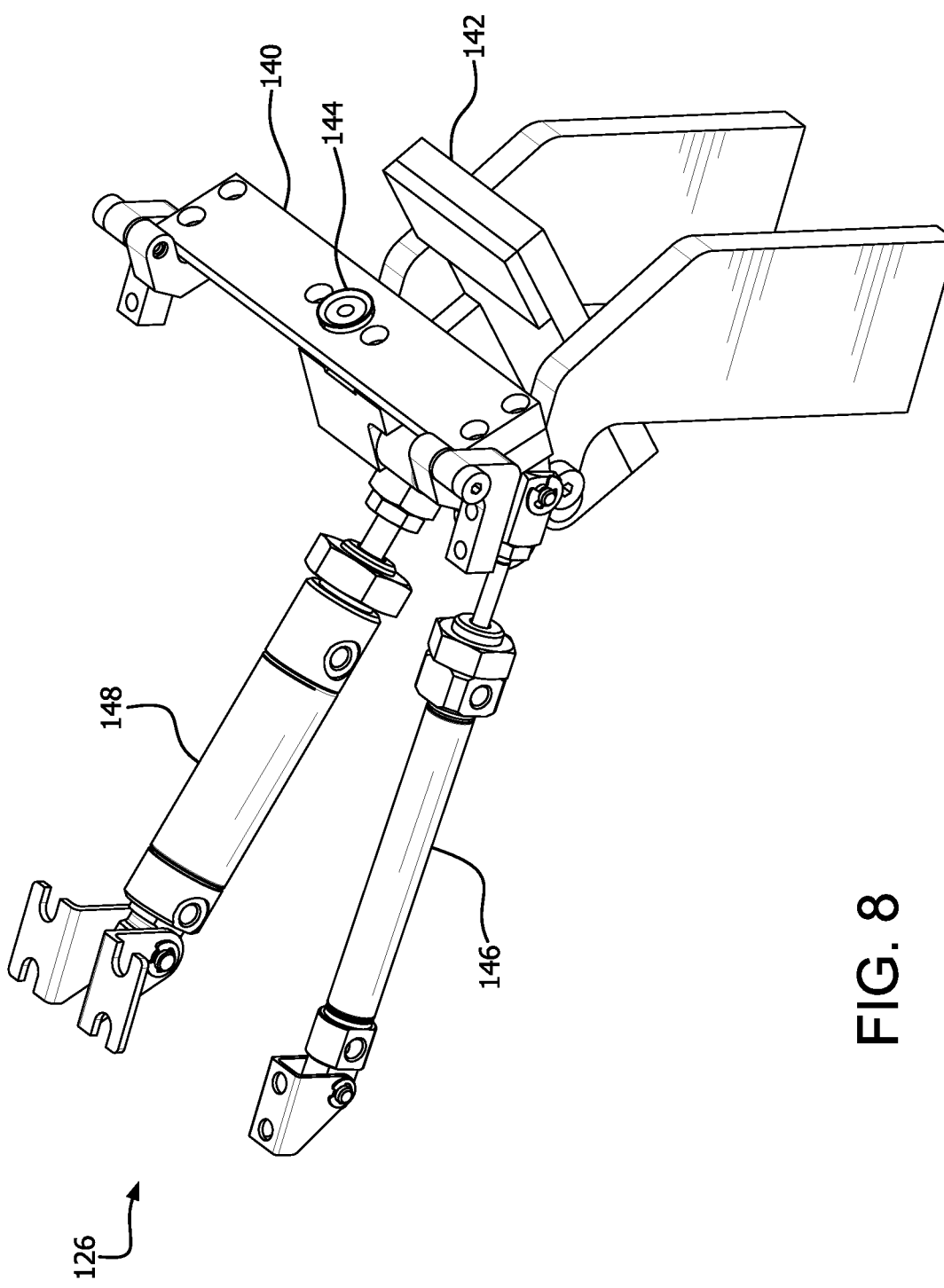
FIG. 8 is a perspective view of the gripper of FIG. 7.
Figure 9:
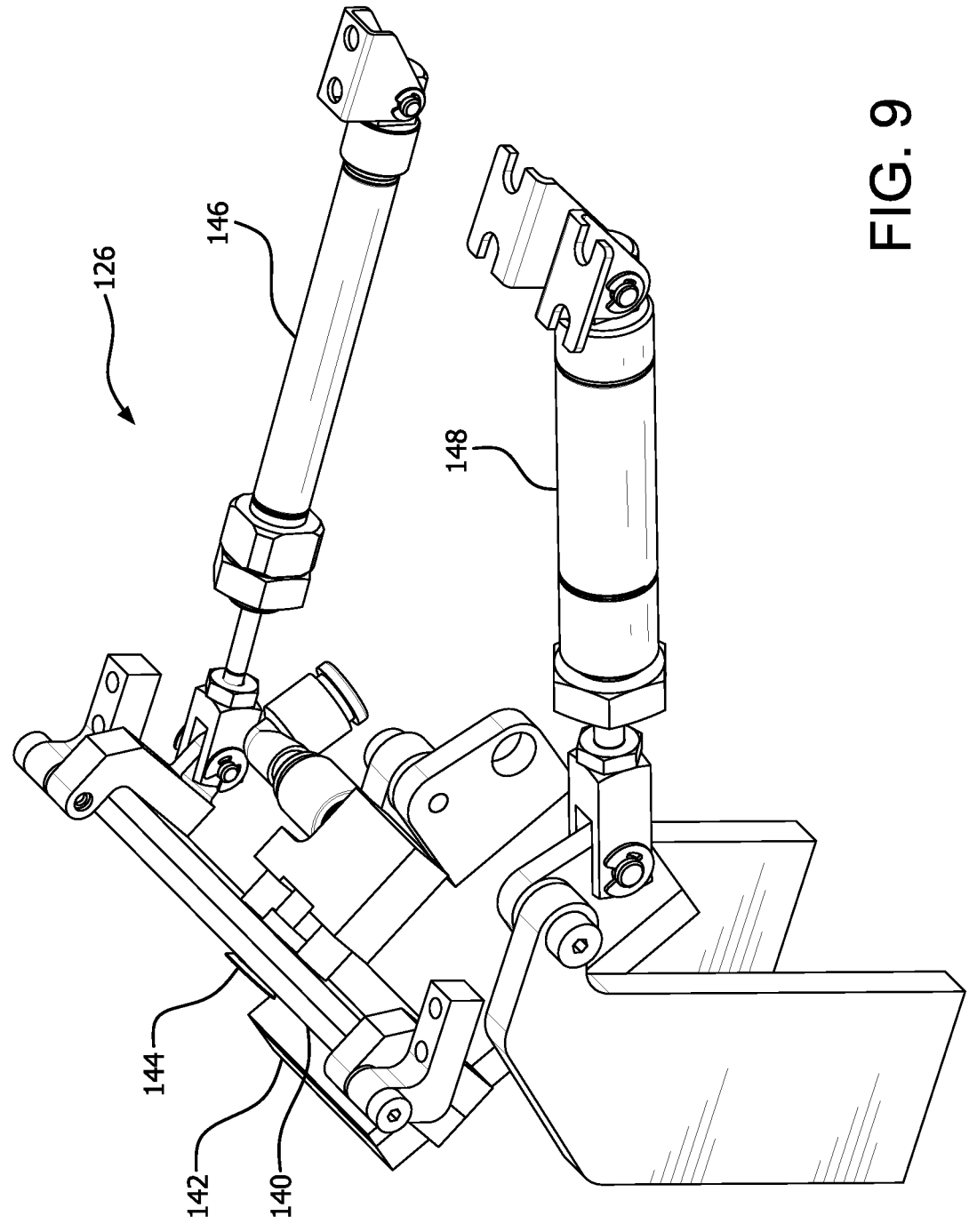
FIG. 9 is an opposite perspective view of the gripper of FIG. 8.

FIGS. 7-9 illustrate the gripper 126 in further detail. The gripper 126 generally includes a first, or upper, jaw 140 and a second, or lower, jaw 142 that are operable to "sandwich" or grip a backing of a sheet therebetween. The first jaw 140 includes a suction applicator 144 for coupling to the backing of the sheet. In some embodiments, the suction applicator 144 may employ active suction (for example, by coupling to one or more pneumatic components) to couple to the backing of the sheet. In other embodiments, a different type of mechanical device may be used instead of the suction applicator 144, such as a needle gripper. The first jaw 140 is displaceable, more specifically pivotable, relative to the upper plate 116 (FIG. 7) via a prime mover 146 (FIGS. 8 and 9), more specifically a linear actuator, and even more specifically a pneumatic or hydraulic actuator. In other embodiments the prime mover 146 may take different forms. For example, the prime mover 146 may be a different linear actuator, such as a rack and pinion drive, or a rotary actuator, such as an electric motor. The second jaw 142 is similarly displaceable, more specifically pivotable, relative to the upper plate 116 (FIG. 7) via a prime mover 148 (FIGS. 8 and 9), more specifically a linear actuator, and even more specifically a pneumatic or hydraulic actuator. In other embodiments the prime mover 148 may take different forms. For example, the prime mover 148 may be a different linear actuator, such as a rack and pinion drive, or a rotary actuator, such as an electric motor.

Figure 10:
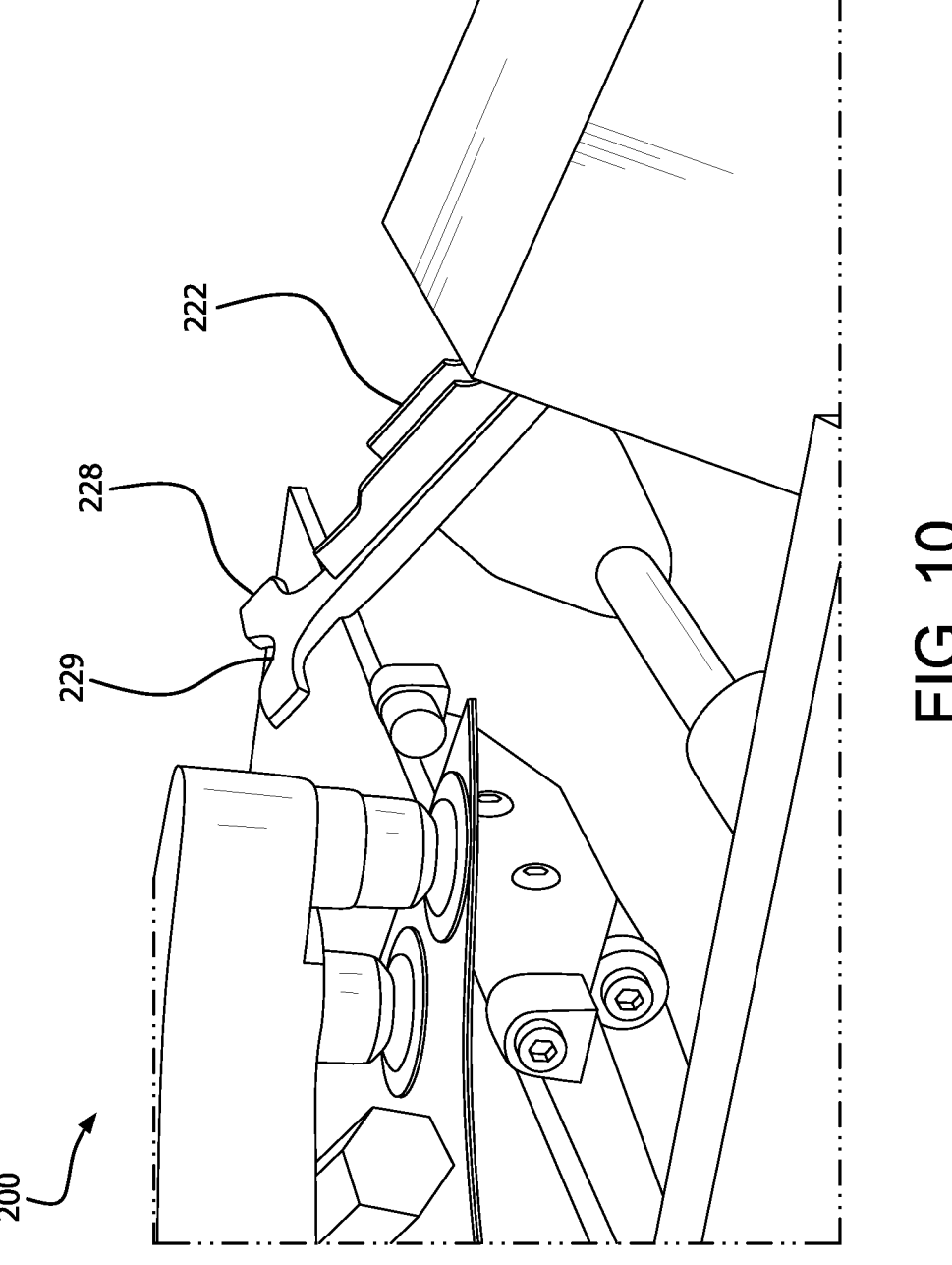
FIG. 10 is a perspective view of a system for separating plies from their backings, according to another embodiment of the present disclosure.

FIG. 10 illustrates a system 200 for separating plies from their backings, according to another embodiment of the present disclosure. The system 200 generally includes similar components as the system 100, although the system 200 only includes a single corner displacer 222. The corner displacer 222 includes an operative end 228 with a letter T-like shape with a notch 229 for avoiding direct contact with the suction applicator of the end effector 112.

Figure 11:
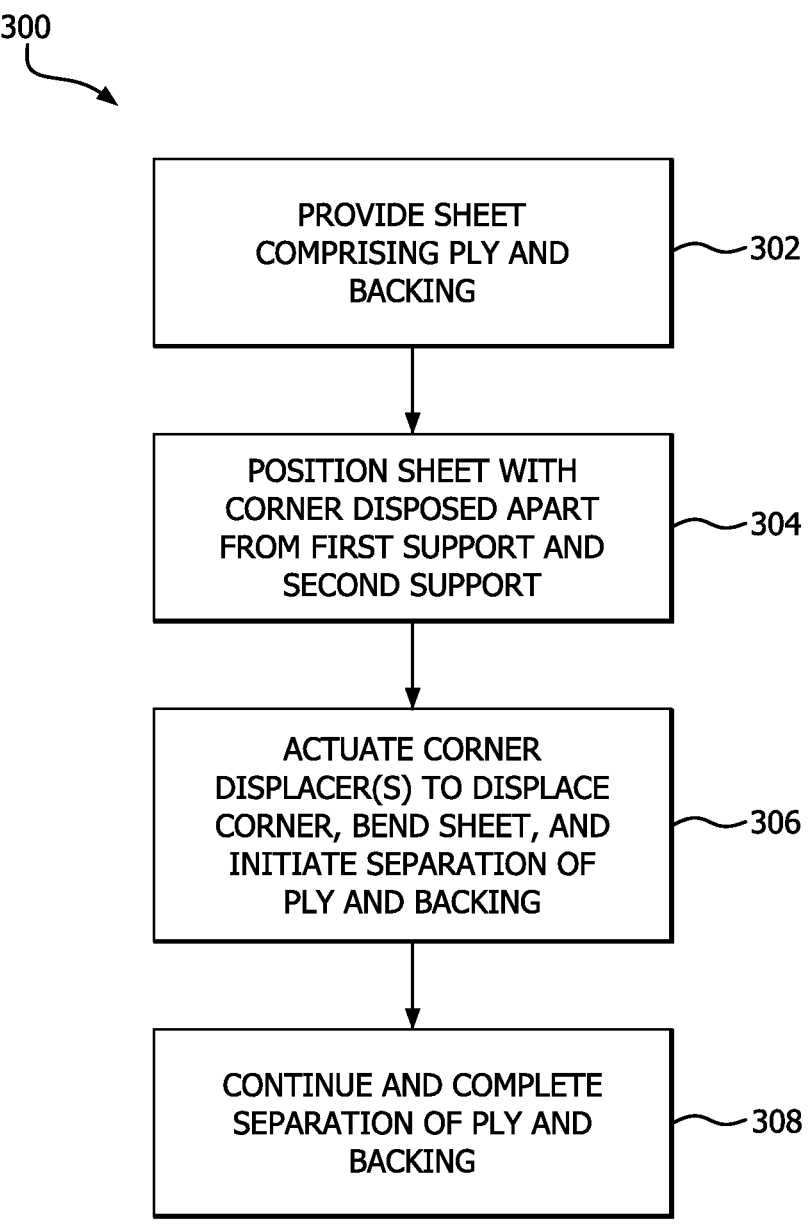
FIG. 11 is a flow diagram of a method for separating plies from their backings, according to another embodiment of the present disclosure.
Figure 12:
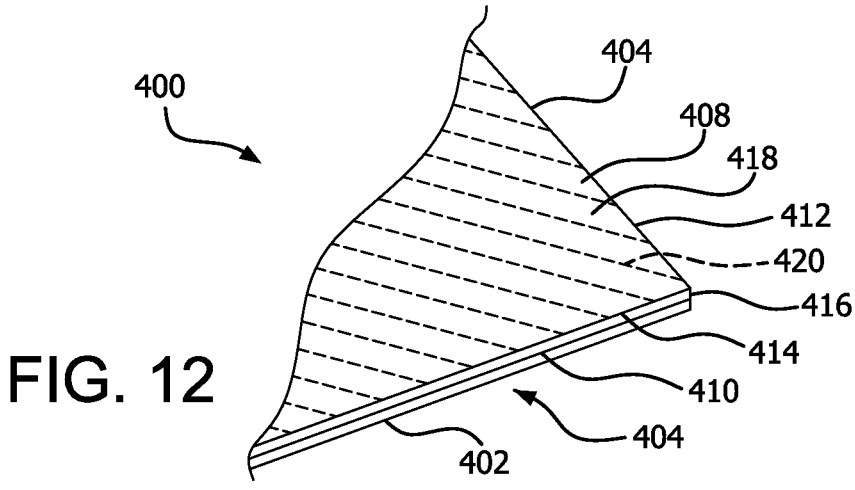
FIG. 12 is a partial perspective view of a sheet including a ply and a backing to be separated via the method of FIG. 11.

FIG. 11 illustrates a flow diagram of a method 300 for separating plies from their backings, according to another embodiment of the present disclosure, and FIGS. 12-17 illustrate certain components and actions associated with the method 300. The method 300 is illustratively described in connection with the system 100, although it is understood that the method 300 may similarly be employed in connection with the system 200. The method 300 begins at block 302 by providing a sheet comprising a ply and a backing. An illustrative sheet 400 is shown in FIG. 12. The backing 402 of the sheet 400 includes a first surface 404 that faces away from the ply 406, and the ply 406 includes a second surface 408 that faces away from the backing 402. Opposite the first surface 404 and the second surface 408, an adhesive bond 410 is disposed between and couples the ply 406 and the backing 402. The backing 402 and the ply 406 together define a first edge 412 and a second edge 414 of the sheet 400, and the first edge 412 and the second edge 414 intersect at a corner 416. In some embodiments and as illustrated, the corner 416 is a sharp corner. In other embodiments, the corner 416 is a rounded corner. In some embodiments, the first edge 412 and the second edge 414 are substantially perpendicular to each other (that is, perpendicular±5 degrees). In other embodiments, the first edge 412 and the second edge 414 are not substantially perpendicular to each other. The ply 406 includes a resin 418 that carries a plurality of reinforcing fibers 420, and the fibers 420 are elongated in a fiber direction. In some embodiments and as illustrated, the fiber direction runs into the corner 416 or, stated another way, substantially bisects (that is, bisect±5 degrees) the angle between the first edge 412 and the second edge 414. In other embodiments, the fiber direction is substantially parallel (that is, parallel±5 degrees) to the first edge 412 or the second edge 414. In some embodiments, the ply 406 is a cross-ply or a woven ply including two sets of fibers running in substantially perpendicular directions. For such plies, one set of fibers necessarily runs into the corner 416 regardless of the orientation of the fibers relative to the first edge 412 and the second edge 414.

Figure 13:
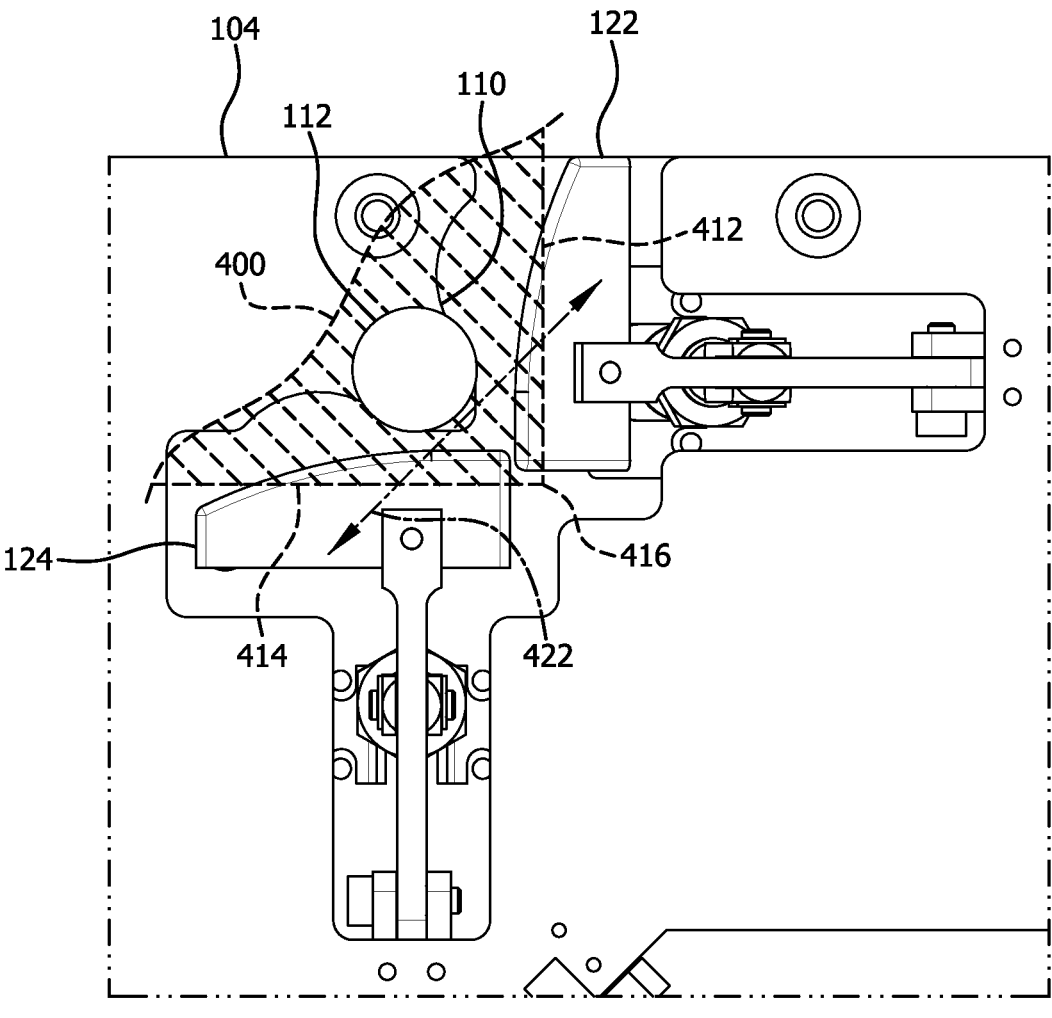
FIG. 13 is a detail top view of the first support, the corner displacers, and an end effector of the separation station of FIG. 3 with the sheet of FIG. 12 positioned between the first support and the end effector.

With continued reference to FIG. 11 and additional reference to FIG. 13, the method 300 continues at block 304 by positioning the sheet 400 relative to the separator 104 such that the corner is disposed apart from, or overhangs, the first support 110 and the second support, more specifically, the end effector 112. In some embodiments, the sheet 400 is positioned by displacing the sheet 400 relative to the first support 110 by using the end effector 112. In some embodiments, the first support 110 contacts the first surface 404 of the backing 402 (shown elsewhere) and the second support, more specifically, the end effector 112, contacts the second surface 408 of the backing 402 (shown elsewhere). As a result, the sheet 400 is "sandwiched" between the first support 110 and the second support, more specifically, the end effector 112.

Figure 14:
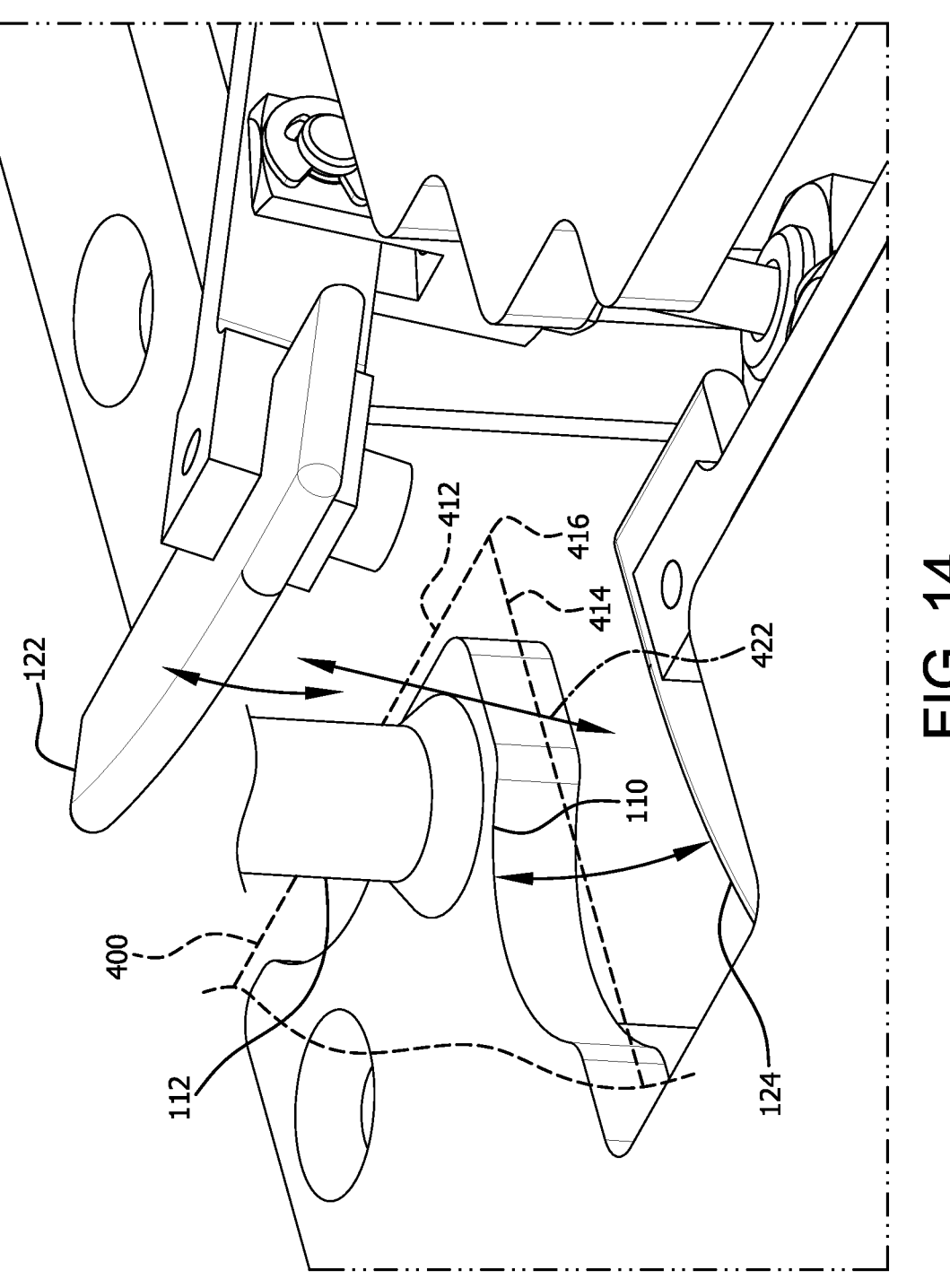
FIG. 14 is a detail perspective view of the first support, the corner displacers, and the end effector of FIG. 13 with the sheet of FIG. 12 positioned between the first support and the end effector and the corner displacers displacing the corner of the sheet.

With continued reference to FIG. 11 and additional reference to FIGS. 13 and 14, the method 300 continues at block 306 by actuating the corner displacers 122, 124 to repeatedly displace the corner 416 of the sheet 400 in a first direction (for example, upward) and an opposite second direction (for example, downward), repeatedly bend areas of the sheet 400 adjacent to the corner 416, and thereby initiate separation of the ply 406 and the backing 402 (shown elsewhere). In some embodiments, bending the areas of the sheet 400 adjacent to the corner 416 causes the adhesive bond 410 (shown elsewhere) to break, thereby initiating separation of the ply 406 and the backing 402. In some embodiments, the first corner displacer 122 contacts the first edge 412 of the sheet 400 and the second corner displacer 124 contacts the second edge 414 of the sheet 400. In some embodiments, the corner displacers 122, 124 cause the sheet 400 to bend about a bending axis 422 that is substantially parallel (that is, parallel±5 degrees) to the first surface 404 and the second surface 408 of the sheet 400 (shown elsewhere). In some embodiments and as illustrated, the bending axis 422 is substantially perpendicular (that is, perpendicular±5 degrees) to the fiber direction of the ply 406. In some embodiments, more specifically those in which the fiber direction of the ply 406 is substantially parallel to the first edge 412 or the second edge 414 of the sheet 400, the first corner displacer 122 or the second corner displacer 124, respectively, may not be actuated, and the first corner displacer 122 and the second corner displacer 124 may not contact the first edge 412 or the second edge 414, respectively. In some embodiments, the bending axis 422 moves during different portions of each bending cycle. More specifically, during the portion of the cycle in which the sheet 400 bends upward, the bending axis 422 may be aligned with the portion of the end effector 112 nearest to the corner 416, and during the portion of the cycle in which the sheet 400 bends downward, the bending axis 422 may be aligned with the portion of the first support 110 nearest to the corner 416. In some embodiments, the corner displacers 122, 124 are actuated, and the sheet 400 is thereby bent, for at least one cycle, and more preferably two or three cycles. In some embodiments, each cycle has a maximum duration of two seconds.

Figure 15:
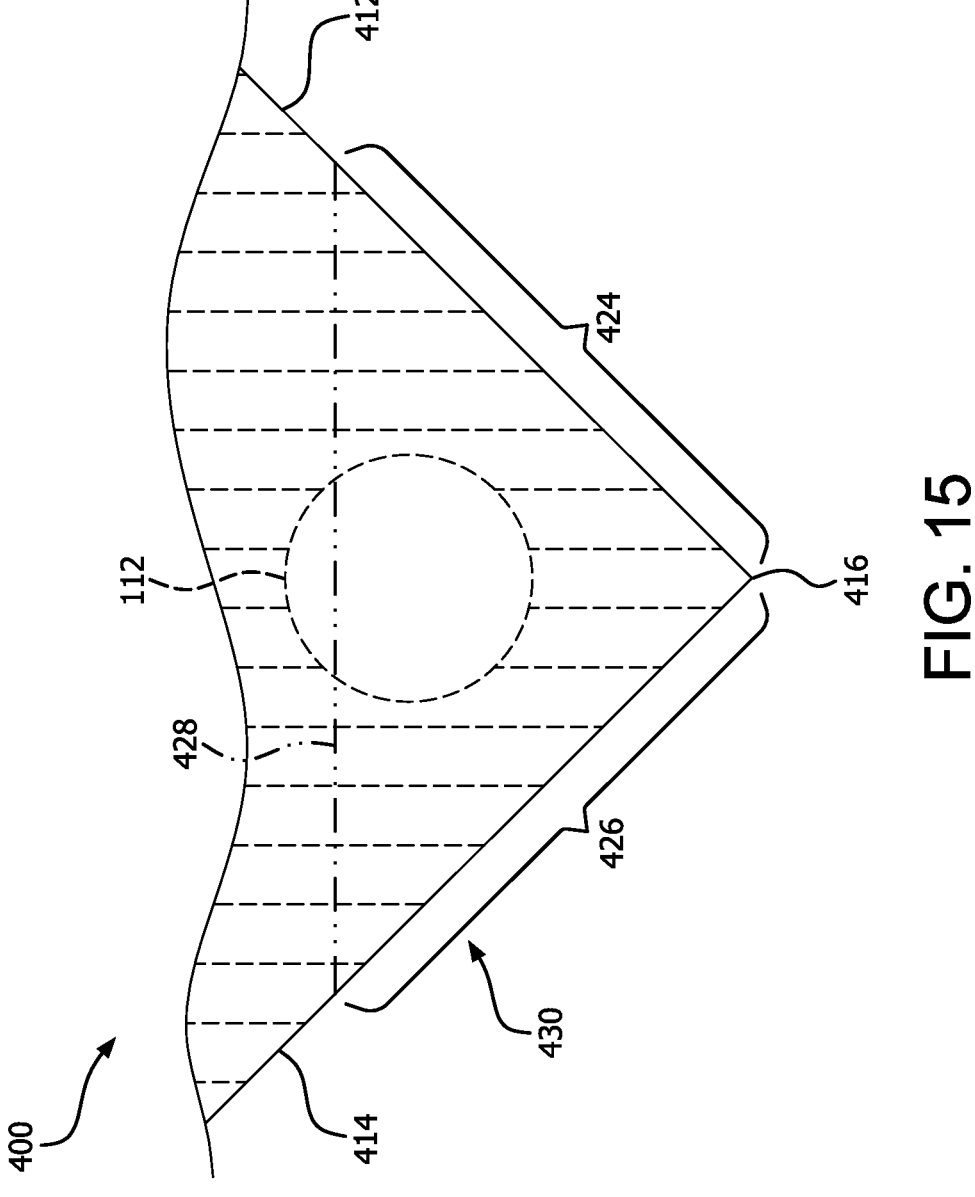
FIG. 15 is a detail top view of the sheet of FIG. 12 specifically illustrating an area of the sheet initially manipulated to by the system of FIG. 1.

Referring specifically to FIG. 15, the first corner displacer 122 (shown elsewhere) contacts a first line segment 424 of the first edge 412 of the sheet 400 and the second corner displacer 124 (shown elsewhere) contacts a second line segment 426 of the second edge 414 of the sheet 400. The first line segment 424, the second line segment 426, and an imaginary line segment 428 connecting the ends of the first line segment 424 and the second line segment 426 opposite the corner 416 bound an initially manipulated area 430 of the sheet 400. In some embodiments and as illustrated, the end effector 112 may be at least partially disposed in the initially manipulated area 430. In some embodiments, the system 100 may specifically interact with the initially manipulated area 430 in the manner described below.

Figure 16:
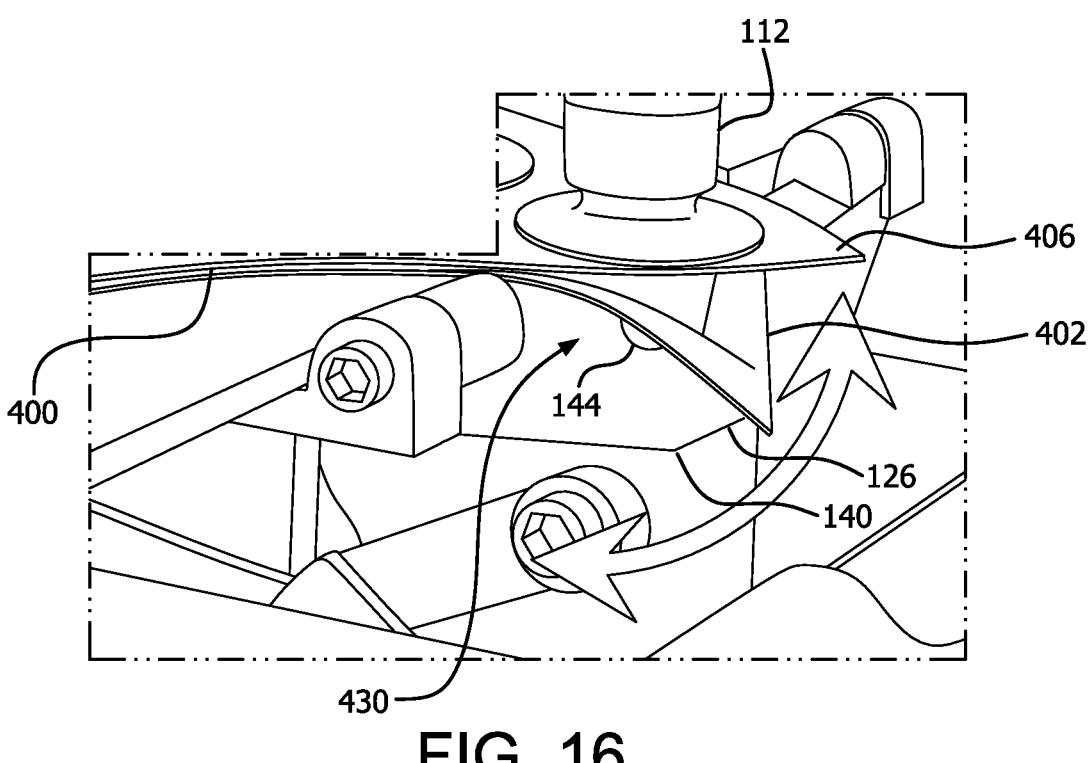
FIG. 16 is a detail perspective view of the gripper of the system of FIG. 1 gripping the initially manipulated area of the sheet of FIG. 15.
Figure 17:
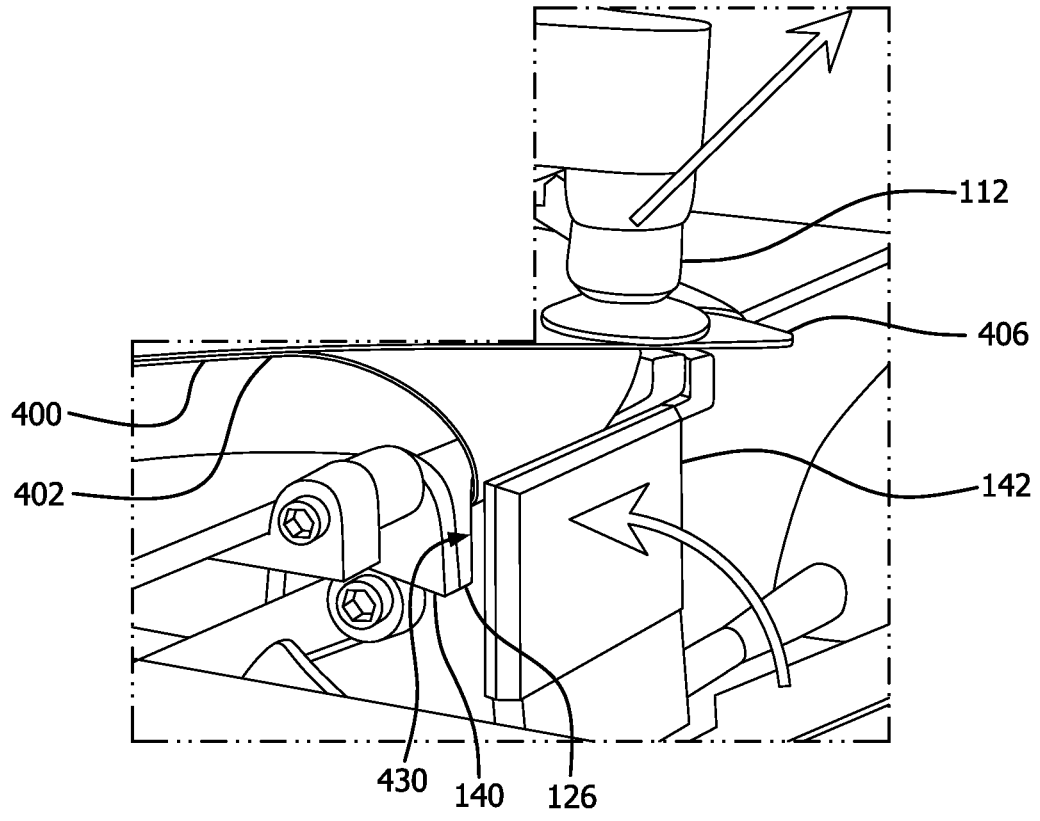
FIG. 17 is a detail perspective view of the gripper and the end effector of the system of FIG. 1 separating the ply and the backing of the sheet of FIG. 12.

After bending the sheet 400, the sheet 400 is displaced toward the gripper 126, for example, via the end effector 112. With reference again to FIG. 11, the method continues at block 308 by relatively displacing the ply 406 and the backing 402 in the initially manipulated area 430 of the sheet 400 away from each other. This action causes other portions of the ply 406 and the backing 402 to separate from each other, thereby completing separation of the ply 406 and the backing 402. More specifically and as shown in FIG. 16, the first jaw 140 of the gripper 126 may first couple to the backing 402, via the suction applicator 144, and the first jaw 140 may then pivot away from the end effector 112. Next and as shown in FIG. 17, the second jaw 142 may then pivot toward the backing 402 and the first jaw 140 to secure the backing between the jaws 140, 142. In some embodiments, the first jaw 140 and the second jaw 142 secure the backing 402 in the initially manipulated area 430 of the sheet 400. The end effector 112 then moves away from the gripper 126 to separate the ply 406 and the backing 402 to complete separation of the ply 406 from the backing 402. In some embodiments, the end effector 112 then displaces the ply 406 to a layup or another appropriate location.

While exemplary embodiments have been illustrated, it is understood that the present disclosure is not limited thereto. The embodiments may be changed, modified and further applied by those skilled in the art. Therefore, the present disclosure is not limited to the details shown and described, but also includes all such changes and modifications.

What is claimed is:

1. A system for separating a ply from a backing, the backing comprising a first surface facing away from the ply, the ply comprising a second surface facing away from the backing, and the ply and the backing together defining a corner, the system comprising:
   a first support configured to contact the first surface apart from the corner;
   a second support configured to contact the second surface apart from the corner;
   a first corner displacer coupled to at least one of the first support and the second support, the first corner displacer configured to displace the corner in a first direction and an opposite second direction to thereby bend portions of the ply and the backing between the corner and the first support and the second support, the portions of the ply and the backing thereby separating from each other, the first corner displacer being pivotable relative to the at least one of the first support and the second support about a first axis; and
   a second corner displacer coupled to the at least one of the first support and the second support, the second corner displacer being pivotable relative to the at least one of the first support and the second support about a second axis, the second axis being different than the first axis.

2. The system of claim 1, wherein the first corner displacer is configured to bend the portions of the ply and the backing about a bending axis, the bending axis being substantially parallel to the first surface and the second surface.

3. The system of claim 1, wherein the first axis and the second axis are substantially perpendicular.

4. The system of claim 1, wherein the second support comprises an end effector configured to displace the ply and the backing relative to the first support.

5. The system of claim 1, wherein the first corner displacer includes a prime mover, an arm coupled to the prime mover, and an operative end coupled to the arm.

6. The system of claim 5, wherein the prime mover is a linear actuator.

7. The system of claim 5, wherein the prime mover is a first prime mover, the arm is a first arm, and the operative end is a first operative end, and the second corner displacer includes a second prime mover, a second arm coupled to the second prime mover, and a second operative end coupled to the second arm.

8. The system of claim 7, wherein the first prime mover is a first linear actuator, and the second prime mover is a second linear actuator.

9. A system for separating a ply from a backing, the backing comprising a first surface facing away from the ply, the ply comprising a second surface facing away from the backing, and the ply and the backing together defining a corner, wherein the ply and the backing include a first edge and a second edge, the first edge and the second edge intersecting at the corner, the system comprising:
   a first support configured to contact the first surface apart from the corner;
   a second support configured to contact the second surface apart from the corner;
   a first corner displacer coupled to at least one of the first support and the second support, the first corner displacer configured to displace the corner in a first direction and an opposite second direction to thereby bend portions of the ply and the backing between the corner and the first support and the second support, the portions of the ply and the backing thereby separating from each other, the first corner displacer being pivotable relative to the at least one of the first support and the second support about a first axis; and
   a second corner displacer coupled to the at least one of the first support and the second support;
   wherein the first corner displacer is configured to contact the first edge and the second corner displacer is configured to contact the second edge.

10. The system of claim 9, wherein the first corner displacer includes a prime mover, an arm coupled to the prime mover, and an operative end coupled to the arm.

11. The system of claim 10, wherein the prime mover is a first prime mover, the arm is a first arm, and the operative end is a first operative end, and the second corner displacer includes a second prime mover, a second arm coupled to the second prime mover, and a second operative end coupled to the second arm.

12. A system for separating a ply from a backing, the backing comprising a first surface facing away from the ply, the ply comprising a second surface facing away from the backing, and the ply and the backing together defining a corner, the system comprising:
   a first support configured to contact the first surface apart from the corner;
   a second support configured to contact the second surface apart from the corner;
   a corner displacer coupled to at least one of the first support and the second support, the corner displacer configured to displace the corner in a first direction and an opposite second direction to thereby bend portions of the ply and the backing between the corner and the first support and the second support, the portions of the ply and the backing thereby separating from each other; and
   a gripper coupled to the first support, the gripper configured to grip the separated portion of the backing.

13. The system of claim 12, wherein the corner displacer includes a prime mover, an arm coupled to the prime mover, and an operative end coupled to the arm.

14. The system of claim 12, wherein the gripper includes a first jaw and a second jaw operable to grip the separated portion of the backing.

15. The system of claim 14, wherein the first jaw includes a suction applicator configured to couple to the backing.

16. The system of claim 14, further comprising a first prime mover coupled to the first jaw and a second prime mover coupled to the second jaw.

17. The system of claim 16, wherein the first prime mover is a first linear actuator and the second prime mover is a second linear actuator.

18. The system of claim 12, wherein the gripper includes a suction applicator configured to couple to the backing.

\* \* \* \* \*